(12) United States Patent
Yue et al.

(10) Patent No.: US 9,347,714 B2
(45) Date of Patent: May 24, 2016

(54) BATTERY ASSEMBLY HAVING A HEAT-DISSIPATING AND HEAT-EMITTING FUNCTIONS

(75) Inventors: Seong-Hoon Yue, Seongnam-si (KR); Min-Hee Lee, Gunpo-si (KR); Yong-Bae Jung, Cheongju-si (KR)

(73) Assignee: LG HAUSYS, LTD., Seoul (KR)

( * ) Notice: Subject to any disclaimer, the term of this patent is extended or adjusted under 35 U.S.C. 154(b) by 308 days.

(21) Appl. No.: 13/885,281

(22) PCT Filed: Nov. 16, 2011

(86) PCT No.: PCT/KR2011/008768
§ 371 (c)(1),
(2), (4) Date: May 14, 2013

(87) PCT Pub. No.: WO2012/067432
PCT Pub. Date: May 24, 2012

(65) Prior Publication Data
US 2013/0236753 A1    Sep. 12, 2013

(30) Foreign Application Priority Data
Nov. 17, 2010   (KR) .................. 10-2010-0114453

(51) Int. Cl.
*H01M 10/50* (2006.01)
*F28F 21/02* (2006.01)
(Continued)

(52) U.S. Cl.
CPC ................ *F28F 21/02* (2013.01); *B82Y 30/00* (2013.01); *B82Y 40/00* (2013.01); *C01B 31/0253* (2013.01);
(Continued)

(58) Field of Classification Search
CPC .......... H01M 10/5004; H01M 10/625; H01M 10/615; H01M 10/647; H01M 10/6571; H01M 10/6555; H01M 10/6554; H01M 10/613; H01M 6/5038; H01M 2/1077; H01M 2220/20; F28F 21/02; B82Y 30/00; B82Y 40/00; C01B 31/0253
See application file for complete search history.

(56) References Cited

U.S. PATENT DOCUMENTS

2007/0254137 A1    11/2007   Koppe et al.
2008/0241488 A1*   10/2008   Ohta et al. .................... 428/198
(Continued)

FOREIGN PATENT DOCUMENTS

CN    101312603 A    11/2008
CN    101855746 A    10/2010
(Continued)

OTHER PUBLICATIONS

International Search Report mailed May 29, 2012 for PCT/KR2011/008768.
(Continued)

*Primary Examiner* — Raymond Alejandro
(74) *Attorney, Agent, or Firm* — Hauptman Ham, LLP

(57) ABSTRACT

According to one embodiment of the present invention, a battery assembly comprises: a battery module comprising a plurality of unit batteries; an exterior case for housing the battery module in an internal space; and a heat-dissipating film which is inserted between the plurality of unit batteries and fitted tightly against each of the plurality of unit batteries, and is attached to the inside surface of the exterior case; and the heat-dissipating film comprises: first and second heat-dissipating layers which are formed of a thermally conductive material and discharge the heat of the unit batteries; and an adhesive layer which is formed between the first and second heat-dissipating layers and adheres the first and second heat-dissipating layers.

6 Claims, 6 Drawing Sheets

(51) Int. Cl.
*H01M 10/613* (2014.01)
*H01M 6/50* (2006.01)
*H01M 2/10* (2006.01)
*C01B 31/02* (2006.01)
*B82Y 30/00* (2011.01)
*B82Y 40/00* (2011.01)
*H01M 10/625* (2014.01)
*H01M 10/615* (2014.01)
*H01M 10/647* (2014.01)
*H01M 10/6571* (2014.01)
*H01M 10/6555* (2014.01)
*H01M 10/6554* (2014.01)

(52) U.S. Cl.
CPC .......... *H01M 2/1077* (2013.01); *H01M 6/5038* (2013.01); *H01M 10/5004* (2013.01); *H01M 10/613* (2015.04); *H01M 10/615* (2015.04); *H01M 10/625* (2015.04); *H01M 10/647* (2015.04); *H01M 10/6554* (2015.04); *H01M 10/6555* (2015.04); *H01M 10/6571* (2015.04); *H01M 2220/20* (2013.01)

(56) References Cited

U.S. PATENT DOCUMENTS

| | | |
|---|---|---|
| 2010/0196716 A1 | 8/2010 | Ohta et al. |
| 2011/0008665 A1 | 1/2011 | Yoon et al. |

FOREIGN PATENT DOCUMENTS

| | | |
|---|---|---|
| JP | 2008120065 | 5/2008 |
| KR | 20070025418 | 3/2007 |
| KR | 100803698 | 3/2008 |
| KR | 20110098290 | 9/2011 |
| KR | 20120052716 | 5/2012 |

OTHER PUBLICATIONS

Chinese Office Action dated Oct. 22, 2014.
Chinese Office Action dated Jun. 5, 2015.

* cited by examiner

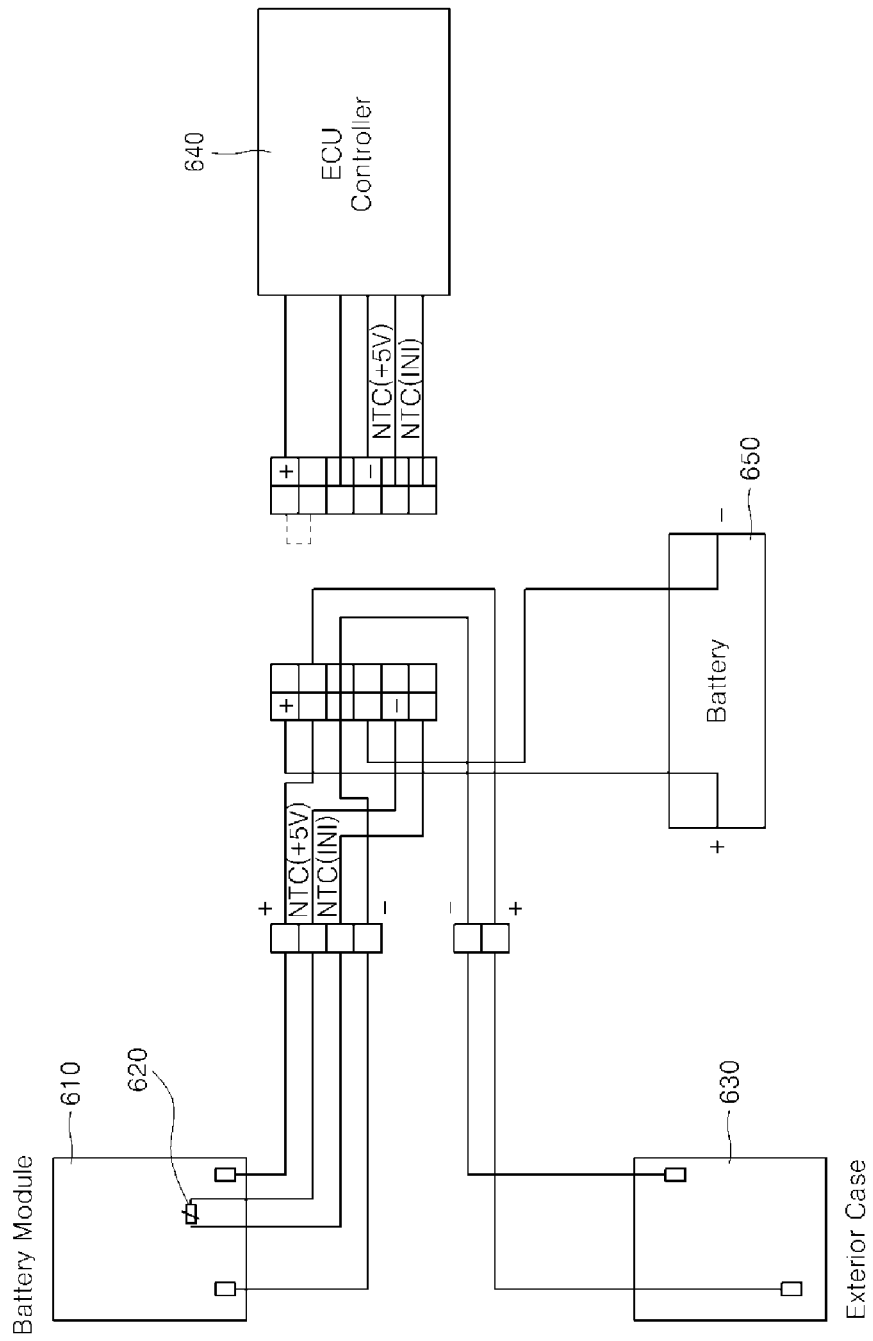

BATTERY ASSEMBLY HAVING A HEAT-DISSIPATING AND HEAT-EMITTING FUNCTIONS

TECHNICAL FIELD

Embodiments of the present invention relate to battery assemblies having heat-dissipating and heat-emitting functions.

BACKGROUND ART

In existing hybrid vehicles, a hot-wire heater or a ceramic-based positive temperature coefficient (PTC) heater is separately mounted to supply hot air, which is heated by the heater as needed, via a fan, thereby improving battery efficiency.

Existing heaters have high initial inrush current, which results in at least twice as much current consumption as the heaters need, and are configured to supply heated air, thereby causing significant reduction in charge capacity of a battery due to heat generation and high initial current consumption in an initial operation stage. Further, in pure electric vehicles, the charge amount of the battery directly affects operation efficiency, so that the existing heaters are not suitable for such electric vehicles.

Thus, one embodiment of the present invention provides a battery assembly, in which a heater is realized using a planar heating body coated with carbon nanotubes (CNTs), such that the heater can be more uniformly and quickly heated by direct thermal conduction, thereby improving initial operation efficiency of the battery assembly.

DISCLOSURE

Technical Problem

An aspect of the present invention is to provide a battery assembly having heat-dissipating and heat-emitting functions, in which a heat-dissipating and heat-emitting film including a carbon nanotube heating body (metal-doped carbon nanotubes) is coated on a battery module and/or an exterior case, and electrical and heat-conductive characteristics of the coated carbon nanotubes are maximized, thereby providing both the heat-dissipating and heat-emitting function at the same time.

Another aspect of the present invention is to provide a battery assembly having heat-dissipating and heat-emitting functions, which is capable of increasing the battery efficiency of a vehicle, which is reduced due to external temperature in initial operation of the vehicle in winter, and capable of quickly removing heat from the battery during operation of the vehicle.

A further aspect of the present invention is to provide a battery assembly having heat-dissipating and heat-emitting functions, which may control heating temperature of a battery module and/or an exterior case using a temperature sensor and a controller to maintain the battery temperature under an optimum condition (0-30° C.), thereby preventing fire due to battery overheating.

Aspects of the present invention are not limited to these aspects and other aspects of the present invention will become apparent to those skilled in the art from the following description.

Technical Solution

In accordance with one aspect of the present invention, a heat-dissipating film includes: first and second heat-dissipating layers formed of a thermally conductive material and discharging heat of unit batteries; and an adhesive layer formed between the first and second heat-dissipating layers to attach the first and second heat-dissipating layers to each other.

The heat-dissipating film may further include a heat-emitting film formed between the first heat-dissipating layer and the adhesive layer.

The heat-emitting film may include a base layer on which an electrode layer and a carbon nanotube (CNT) heating body are printed; and an insulating layer formed between the electrode layer of the base layer and the first heat-dissipating layer to attach the base layer to the first heat-dissipating layer while insulating the electrode layer and the first heat-dissipating layer from each other.

The carbon nanotube heating body may be formed by doping, on surfaces of carbon nanotubes, at least one metal selected from among Ag, Cu, Ni, Au, Pt, and Pd.

The insulating layer may be a double-sided adhesive film formed of any one adhesive selected from among acrylic adhesives, hot-melt adhesives, silicone adhesives, and rubber adhesives.

The electrode layer of the base layer may be electrically connected to both an anode and a cathode of each of the unit batteries to provide a heat-emitting function to the carbon nanotube heating body.

The base layer may be formed of at least one material selected from among biaxially oriented polyester (BOPET), polyethylene terephthalate (PET), oriented polystyrene (OPS), oriented polypropylene (OPP), polyethylene naphthalate (PEN), polyether sulfone (PES), polyphenylene sulfide (PPS), polyimide (PI), and polyether imide (PEI).

The adhesive layer may be a double-sided tape formed of any one selected from among acrylic tapes, hot-melt tapes, silicone tapes, and rubber tapes.

In accordance with another aspect of the present invention, a battery assembly includes: a battery module including a plurality of unit batteries; an exterior case for housing the battery module in an internal space; and a heat-dissipating film inserted between the plurality of unit batteries to tightly contact each of the unit batteries and to be attached to an inner surface of the exterior case. Here, the heat-dissipating film includes: first and second heat-dissipating layers formed of a thermally conductive material and discharging heat of the unit batteries; and an adhesive layer formed between the first and second heat-dissipating layers to attach the first and second heat-dissipating layers to each other.

The battery assembly may further include a heat-emitting film formed between the first heat-dissipating layer and the adhesive layer.

The heat-emitting film may include a base layer on which an electrode layer and a carbon nanotube (CNT) heating body are printed; and an insulating layer formed between the electrode layer of the base layer and the first heat-dissipating layer to attach the base layer to the first heat-dissipating layer while insulating the electrode layer and the first heat-dissipating layer from each other.

The battery assembly may further include: a temperature sensor provided to at least one of the unit batteries; and a controller controlling power supply to the electrode layer of the base layer based on temperature detection results from the temperature sensor.

In accordance with a further aspect of the present invention, an exterior case includes a heat-dissipating film attached to an inner surface thereof and discharges heat generated from unit batteries, wherein the heat-dissipating film includes: first and second heat-dissipating layers formed of a thermally conductive material and discharging heat from the unit batteries; and an adhesive layer formed between the first and second heat-dissipating layers to attach the first and second heat-dissipating layers to each other.

The exterior case may further include a heat-emitting film formed between the first heat-dissipating layer and the adhesive layer.

The heat-emitting film may include a base layer on which an electrode layer and a carbon nanotube (CNT) heating body are printed; and an insulating layer formed between the electrode layer of the base layer and the first heat-dissipating layer to attach the base layer to the first heat-dissipating layer while insulating the electrode layer and the first heat-dissipating layer from each other.

The exterior case may further include: a temperature sensor provided to at least one inner surface of the exterior case; and a controller controlling power supply to the electrode layer of the base layer based on temperature detection results from the temperature sensor.

Details of other embodiments will be described in the detailed description with reference to the accompanying drawings.

The above and other aspects, features, and advantages of the invention will become apparent from the detailed description of the following embodiments in conjunction with the accompanying drawings. It should be understood that the present invention is not limited to the following embodiments and may be embodied in different ways, and that the embodiments are provided for complete disclosure and thorough understanding of the invention by those skilled in the art. The scope of the invention is defined only by the claims. Like components will be denoted by like reference numerals throughout the specification.

Advantageous Effects

According to one embodiment of the present invention, there is provided a battery assembly having heat-dissipating and heat-emitting functions, in which a heat-dissipating and heat-emitting film having a carbon nanotube heating body is coated on a battery module and/or an exterior case, and electrical and heat-conductive characteristics of the coated carbon nanotubes are maximized, thereby providing both the heat-dissipating and heat-emitting function at the same time.

According to one embodiment of the present invention, there is provided a battery assembly having heat-dissipating and heat-emitting functions, which is capable of increasing battery efficiency of a vehicle even when the vehicle initially operates in winter, and capable of rapidly removing heat from the battery during operation of the vehicle.

According to one embodiment of the present invention, there is provided a battery assembly having heat-dissipating and heat-emitting functions, which controls the heating temperature of a battery module and/or an exterior case using a temperature sensor and a controller, such that battery temperature can be maintained under an optimum condition (0-30° C.), thereby preventing fire due to battery overheating.

DESCRIPTION OF DRAWINGS

FIG. 6 is a view of an exemplary process for controlling the heating temperature of both the battery module and the exterior case using the temperature sensor and the controller.

BEST MODE

Figure 1:
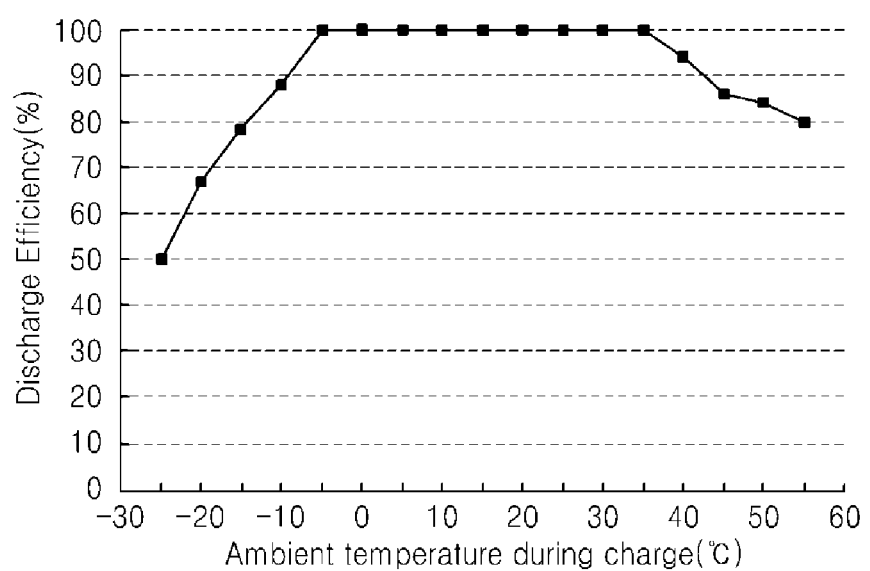
FIG. 1 is a graphical diagram showing test results on discharge efficiency with respect to ambient temperature in a battery module mounted in an electric vehicle.

FIG. 1 is a graphical diagram showing test results on discharge efficiency with respect to ambient temperature in a battery module mounted in an electric vehicle.

Referring to FIG. 1, it can be seen that battery efficiency is gradually degraded at 20° C. or less below zero and at 40° C. above zero during discharge.

Further, in Table 1, it can be seen that, for a 1200 Wh product, the discharge efficiency is 88% at 10° C. below zero and 66% at 20° C. below zero. Thus, a preferred temperature ranges from 0° C. to 30° C. to maintain a battery in an optimum operating condition.

Therefore, the present invention provides a battery module, an exterior case, and a battery assembly having these components, which are capable of increasing battery efficiency of a vehicle, which can be reduced due to external temperature when the vehicle initially operates in winter, and capable of quickly removing heat from the battery generated during operation of the vehicle.

To this end, according to one embodiment of the present invention, carbon nanotubes (CNT) are coated on a battery module and/or an exterior case in a constant pattern, and electrical and heat-conductive characteristics of the coated carbon nanotubes are maximized, thereby providing both the heat-dissipating and heat-emitting function at the same time.

Although carbon nanotubes are used as a material having heat-dissipating and heat-emitting functions in some embodiments of the invention, it is difficult to provide such heat-dissipating and heat-emitting functions using pure carbon nanotubes alone.

Thus, according to some embodiments, the carbon nanotubes may be doped with metal (metal doped CNT) to maximize heat-dissipating and heat-emitting characteristics. Methods for coating the metal doped CNT on the battery module or the exterior case include pad printing, spray coating, printing using a transfer film, and the like. According to one embodiment, a uniform metal doped CNT layer may be formed on a 3-D contour using such coating methods.

Such a conductive layer may provide a heat-dissipating function to dissipate heat from the battery module in a normal state, and may receive electric energy to emit heat, as needed.

According to one embodiment of the invention, a CNT coating film providing both a heat-dissipating function and a heat-emitting function may be disposed between flat batteries and connected to the battery module or the exterior case, thereby maximizing battery efficiency.

According to one embodiment of the invention, since excessive heat-emission can cause explosion of the battery, a controller may be used to maintain battery efficiency, thereby preventing fire due to heat-emission of the battery and thereby securing safety.

According to the embodiment of the invention, in an initial operating stage of a heater, inrush current is not generated, such that excessive current is not generated and the battery is uniformly and rapidly heated, thereby improving heat-emitting efficiency.

Embodiments of the present invention may provide heat-dissipating and heat-emitting features by applying a coating to a high-strength plastic exterior case, which is manufactured by prepregging polyphenylene sulfide (PPS), epoxy, polypropylene (PP), polyethylene (PE), polyamide (PA) or the like into glass fibers, pitch based carbon fibers, polyacryl nitrile (PAN)-based carbon fibers, pitch based carbon chopped fibers, or pitch based milled fibers, as well as stainless steel (SUS) or Al exterior cases, which are generally used to form exterior casings of batteries.

Embodiments of the present invention will now be described in detail with reference to the accompanying drawings.

Figure 2:
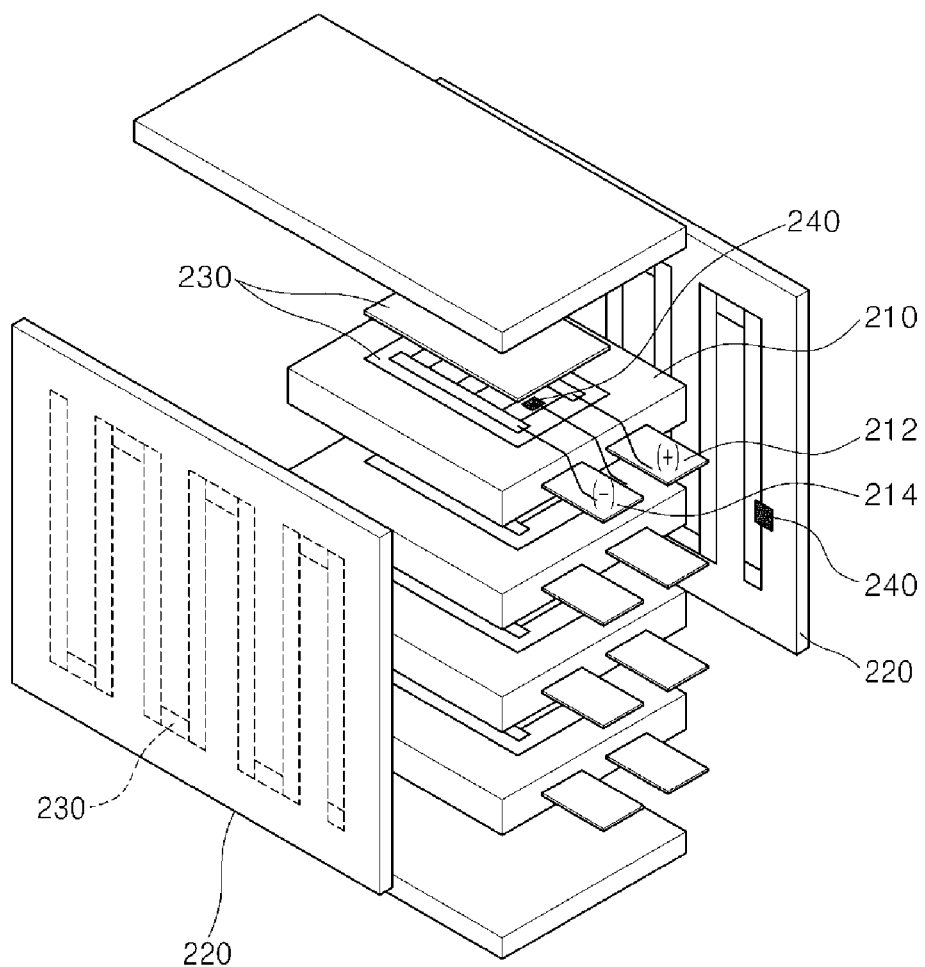
FIG. 2 is an exploded perspective view of a battery assembly according to one embodiment of the present invention.
Figure 3:
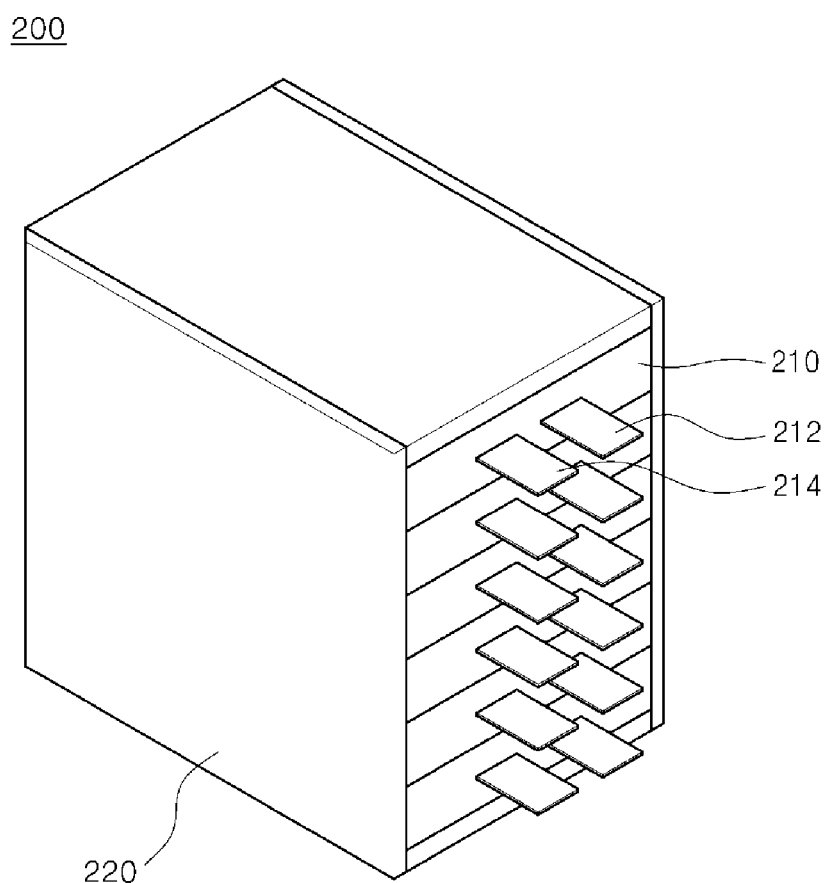
FIG. 3 is an assembled perspective view of the battery assembly according to the embodiment of the present invention.
Figure 4:
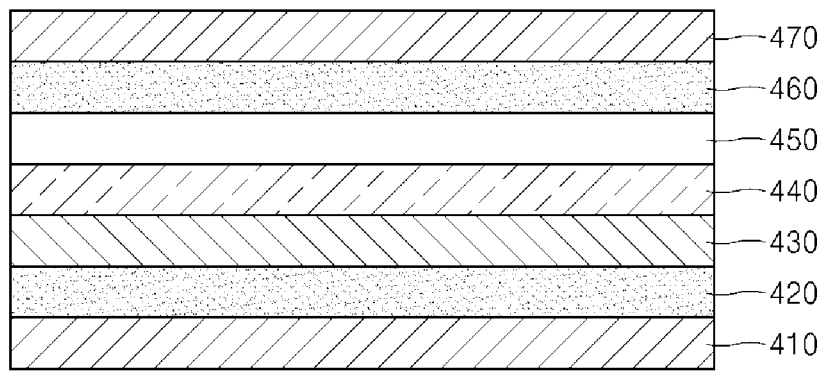
FIG. 4 is a view of a stack structure of a heat-dissipating and heat-emitting film formed on a battery module and an exterior case shown in FIG. 2.

FIG. 2 is an exploded perspective view of a battery assembly according to one embodiment of the present invention, FIG. 3 is an assembled perspective view of the battery assembly according to the embodiment of the present invention, and FIG. 4 is a view of a stack structure of a heat-dissipating and heat-emitting film formed on a battery module and an exterior case shown in FIG. 2.

Referring first to FIGS. 2 and 3, a battery assembly 200 according to one embodiment of the invention may include a battery module, an exterior case 220, and a heat-dissipating and heat-emitting film 230.

The battery module includes a plurality of unit batteries 210. Each of the unit batteries 210 includes an anode 212 serving as a positive electrode, and a cathode 214 serving as a negative electrode. The heat-dissipating and heat-emitting film 230 is interposed in a closely compact manner between the unit batteries 210. Details of the heat-dissipating and heat-emitting film 230 will be described below with reference to FIG. 4.

The exterior case 220 receives the plurality of unit batteries 210 therein. That is, the exterior case 220 serves as a cover for the plurality of unit batteries 210. The heat-dissipating and heat-emitting film 230 may also be attached to an inner surface of the exterior case 220.

Although the heat-dissipating and heat-emitting film 230 is described as being formed both between the plurality of unit batteries 210 and on the inner surface of the exterior case 220 in this embodiment, the present invention is not limited thereto. Thus, various heat-dissipating and heat-emitting films 230 may be formed only between the unit batteries 210, or otherwise the heat-dissipating and heat-emitting film 230 may be formed only on the inner surface of the exterior case 220.

The heat-dissipating and heat-emitting film 230 may include a heat-dissipating film which dissipates heat from the plurality of unit batteries 210, and a heat-emitting film which emit heat upon receiving power.

The heat-dissipating and heat-emitting film 230 will be described in more detail with reference to FIG. 4. For reference, FIG. 4 shows a stack structure of the heat-dissipating and heat-emitting film 230 of FIG. 1.

As shown in FIG. 4, the heat-dissipating and heat-emitting film 230 may include a first heat-dissipating layer 410, an insulating layer 420, an electrode layer 430, a carbon nanotube heating body 440, a base layer 450, an adhesive layer 460, and a second heat-dissipating layer 470.

The first heat-dissipating layer 410 is formed not only on each of the surfaces of the unit batteries 210, but also on the inner surface of the exterior case 220. The first heat-dissipating layer 410 may be formed of a thermally conductive material such as Al, Cu or the like, to dissipate heat from the unit batteries.

The insulating layer 420 is formed on the first heat-dissipating layer 410. The insulating layer 420 is interposed between the first heat-dissipating layer 410 and the electrode layer 430 to insulate the first heat-dissipating layer 410 and the electrode layer 430 from each other while allowing adhesion therebetween.

To this end, the insulating layer 420 may be realized by a double-sided adhesive film composed of adhesives, such as acrylic adhesives, hot-melt adhesives, silicone adhesives, rubber adhesives, and the like.

The electrode layer 430 is formed on the insulating layer 420. As described above, the electrode layer 430 is attached to the insulating layer 420. The electrode layer 430 may be formed of an electrically conductive material, such as Ag, Cu, Au, Al or the like.

Such an electrode layer 430 may be electrically connected to the anode (positive electrode) and the cathode (negative electrode) of each of the unit batteries 210 to provide a heat-emitting function to the carbon nanotube heating body 440.

The carbon nanotube (CNT) heating body 440 is formed on the electrode layer 430. The carbon nanotube heating body 440 may be formed by doping metal on the carbon nanotube surface.

Although carbon nanotubes are known to have excellent electric and heat-conductive characteristics, if the carbon nanotubes are used as coating pastes, there can be a problem of deterioration in electrical conductivity due to dispensability and increased contact resistance of the carbon nanotubes in a 3D contoured product.

Accordingly, in some embodiment of the present embodiment, metal doped carbon nanotubes are used instead of pure carbon nanotubes so as to provide effects of improving electrical conductivity and thermal conductivity.

When the carbon nanotubes are coated with metal, infrared (IR) wavelengths are reflected by the metal and heat-dissipating characteristics are improved, whereby the carbon nanotube heating body is also suitably used as a heat-dissipating coating material.

Here, the metal may include at least one selected from among Ag, Cu, Ni, Au, Pt, and Pd.

The base layer 450 is formed on the carbon nanotube heating body 440. The base layer 450 may be formed of at least one material selected from among biaxially oriented polyester (BOPET), polyethylene terephthalate (PET), oriented polystyrene (OPS), oriented polypropylene (OPP), polyethylene naphthalate (PEN), polyether sulfone (PES), polyphenylene sulfide (PPS), polyimide (PI), and polyether imide (PEI).

The adhesive layer 460 is formed on the base layer 450. The adhesive layer 460 serves to attach the base layer 450 and the first heat-dissipating layer 470 to each other. To this end, the adhesive layer 460 may be realized by a double-sided tape composed of at least one of acrylic tapes, hot-melt tapes, silicone tapes, and rubber tapes.

The second heat-dissipating layer 470 is formed on the adhesive layer 460. The second heat-dissipating layer 470 serves to dissipate heat from the unit batteries. To this end, the second heat-dissipating layer 470 may be formed of a thermally conductive material such as Al, Cu or the like.

For reference, the first and second heat-dissipating layers 410, 470 and the adhesive layer 460 correspond to the heat-dissipating film, and the insulating layer 420, the electrode layer 430, the carbon nanotube heating body 440, and the base layer 450 correspond to the heat-emitting film.

Now, a method of manufacturing the heat-dissipating and heat-emitting film 230 will be described.

First, the electrode layer 430 and the carbon nanotube heating body 440 are printed on one side of the base layer 450.

Next, the first heat-dissipating layer 410 is placed below the electrode layer 430, the insulating layer 420 is disposed between the first heat-dissipating layer and the electrode layer, and the base layer 450 on which the electrode layer and the carbon nanotube heating body 440 are printed is attached to the first heat-dissipating layer 410.

Then, the second heat-dissipating layer 470 is placed on the other side of the base layer 450, the adhesive layer 460 is disposed between the base layer and the second heat-dissipating layer, and the base layer 450 attached to the first heat-dissipating layer 410 is attached to the second heat-dissipating layer 470.

The heat-dissipating and heat-emitting film 230 may be manufactured by this process. The heat-dissipating and heat-emitting film 230 may be coated on the unit batteries 210 and the exterior case 220 by pad printing, spray coating, printing using a transfer film, or the like.

The battery assembly 200 according to one embodiment of the invention may further include a temperature sensor 240 and a controller (640 in FIG. 6).

The temperature sensor 240 may be provided to at least one of the unit batteries 210 to detect the temperature of the unit battery 210. In this embodiment, the temperature sensor 240 may be a negative temperature coefficient (NTC) sensor.

The controller controls power supply to the electrode layer 430 based on temperature detection results of the temperature sensor 240. Thus, the controller may allow the unit battery 210 to maintain an optimal temperature condition ranging from 0 to 30 degrees. In the present embodiment, the controller may be an electronic control unit (ECU) controller of a vehicle (particularly an electric vehicle).

Now, the process of controlling heat emitted from the exterior case or the battery module using the temperature sensor and the controller will be described with reference to FIGS. 5 and 6.

Figure 5:
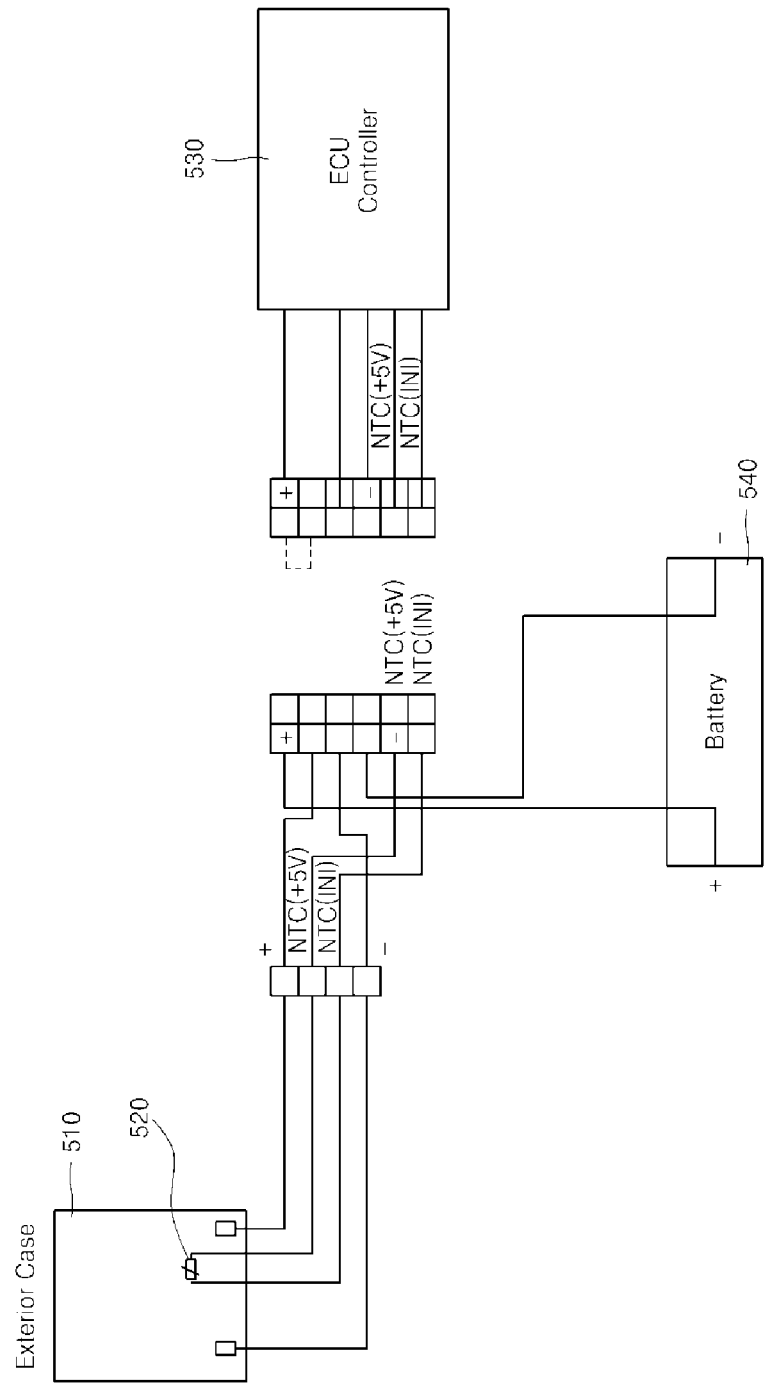
FIG. 5 is a view of an exemplary process for individually controlling the heating temperature of the exterior case using a temperature sensor and a controller.

FIG. 5 is a view of an exemplary process for individually controlling the heating temperature of the exterior case using a temperature sensor and a controller, and FIG. 6 is a view of an exemplary process for controlling the heating temperature of both the battery module and the exterior case using the temperature sensor and the controller.

As shown in FIG. 5, a heat-dissipating and heat-emitting film is coated on the inner surface of an exterior case 510, and an NTC sensor 520 (temperature sensor) is attached to the heat-dissipating and heat-emitting film. The NTC sensor 520 detects the temperature of heat emitted from the exterior case 510 and sends the detection result (temperature) to an ECU controller 530.

The ECU controller 530 regulates power supply to the heat-dissipating and heat-emitting film of a battery 540 based on the detected temperature, thereby maintaining a suitable temperature of the exterior case 510.

Next, as shown in FIG. 6, a heat-dissipating and heat-emitting film is coated on a battery module 610, and an NTC sensor 620 (temperature sensor) is attached to the heat-dissipating and heat-emitting film. The NTC sensor 620 detects the temperature of heat emitted from the battery module 610 and sends the detection result (temperature) to an ECU controller 640.

The ECU controller 640 regulates power supply to a battery 650 based on the detected temperature, thereby controlling power supply to the heat-dissipating and heat-emitting film inserted into or coated on the battery module 610 and the exterior case 630. As a result, the ECU controller 640 may maintain the temperature of the battery module 610 and the exterior case 630 to be under optimal conditions (0-30° C.).

According to the embodiment, a heat-dissipating and heat-emitting film having a carbon nanotube heating body (metal doped carbon nanotubes) is coated on a battery module and/or an exterior case, and electrical and heat-conductive characteristics of the coated carbon nanotubes are maximized, thereby providing both the heat-dissipating and heat-emitting functions at the same time.

According to the embodiment, it is possible to increase battery efficiency of a vehicle, which is reduced due to external temperature when the vehicle initially operates in winter, and to achieve rapid removal of heat from the battery during operation of the vehicle.

According to the embodiment, the heating temperature of a battery module and/or an exterior case is controlled using a temperature sensor and a controller, such that the battery temperature can be maintained under an optimum condition (0-30° C.), thereby preventing fire due to battery overheating.

Although some embodiments have been described herein, it will be understood by those skilled in the art that these embodiments are provided for illustration only, and various modifications, changes, alterations and equivalent embodiments can be made without departing from the scope of the present invention. Therefore, the scope and sprit of the present invention should be defined only by the accompanying claims and equivalents thereof.

EXAMPLES

Heat-Dissipating Effects of Heat-Dissipating Film

Example 1

A carbon nanotube heating body and an Ag electrode layer were printed on a base layer composed of biaxially oriented polyethylene terephthalate (BOPET). The carbon nanotube heating body was formed by doping Ag on the surfaces of carbon nanotubes. Next, with a first heat-dissipating layer placed below the electrode layer, an insulating layer composed of an acrylic adhesive was interposed therebetween, and the base layer on which the electrode layer and the carbon nanotube heating body were printed was attached to the first heat-dissipating layer.

Next, with a second heat-dissipating layer placed on the other side of the base layer, a silicone adhesive layer was interposed therebetween, and the base layer adhered to the first heat-dissipating layer was attached to the second heat-dissipating layer.

Example 2

A carbon nanotube heating body was printed on a base layer composed of biaxially oriented polyethylene terephthalate (BOPET). The printed carbon nanotube heating body was coated with a Cu electrode layer. The carbon nanotube heating body was formed by doping Cu on the surfaces of carbon nanotubes. Next, with a first heat-dissipating layer placed below the electrode layer, an insulating layer composed of an acrylic adhesive was interposed therebetween, and the base layer on which the electrode layer and the carbon nanotube heating body were printed was attached to the first heat-dissipating layer.

Next, with a second heat-dissipating layer placed on the other side of the base layer, a silicone adhesive layer was interposed therebetween, and the base layer adhering to the first heat-dissipating layer was attached to the second heat-dissipating layer.

Comparative Example 1

A sample was manufactured in the same manner as in Example 1 except for a carbon nanotube heating body was not included therein.

Comparative Example 2

A sample was manufactured in the same manner as in Example 1 except that pure carbon nanotubes were used instead of the Ag-doped carbon nanotubes.

Heat-dissipating effects by the heat-dissipating films of Examples 1 and 2 and Comparative Examples 1 and 2 were measured in such a manner that samples were attached to a 2 mm thick A5052 Al plate placed on a flat DC heater using a highly thermally-conductive adhesive resin (3.6 W/mK) and heated to a certain temperature, and subsequently, after the heater was turned off, the surface temperature was measured using a K-type thermocouple at certain time intervals. As a result, a portion other than heat-dissipating film-attached portions had constant temperature, and the heat-dissipating film-attached portions had different temperature-reduction rates according to heat-dissipating effects of the heat-dissipating films.

Temperature measurement results of the heat-dissipating films of Examples 1 and 2 and Comparative Examples 1 and 2 are shown in Table 1 below.

TABLE 1

| | Time | Example 1 (° C.) | Example 2 (° C.) | Comparative Example 1 (° C.) | Comparative Example 2 (° C.) |
|---|---|---|---|---|---|
| 1 | 0 | 80.0 | 80.0 | 80.0 | 80.0 |
| 2 | After 3 min | 77.8 | 78.0 | 79.0 | 79.1 |
| 3 | After 6 min | 75.7 | 76.0 | 77.3 | 78.3 |
| 4 | After 9 min | 73.7 | 73.8 | 75.4 | 76.4 |
| 5 | After 12 min | 71.4 | 71.4 | 74.8 | 75.1 |
| 6 | After 15 min | 69.2 | 69.2 | 73.2 | 74.8 |

As shown in Table 1, it could be seen that Examples 1 and 2 showed much greater temperature-reduction than Comparative Examples 1 and 2 that did not contain a carbon nanotube heating body. That is, it could be seen that considerable temperature-reduction of a heat-emitting product was obtained by the provision of the heat-emitting film having the carbon nanotube heating body. As a result, the heat-dissipating film according to the present invention clearly exhibits vastly superior thermal conductivity.

Although some embodiments have been described herein with reference to the accompanying drawings, it will be understood by those skilled in the art that these embodiments are provided for illustration only, and various modifications, changes, alterations and equivalent embodiments can be made without departing from the scope of the present invention. Therefore, the scope and sprit of the present invention should be defined only by the accompanying claims and equivalents thereof.

The invention claimed is:

1. A heat-dissipating film comprising:
   first and second heat-dissipating layers formed of a thermally conductive material that discharges heat of unit batteries;
   an adhesive layer formed between the first and second heat-dissipating layers to attach the first and second heat-dissipating layers to each other;
   a heat-emitting film formed between the first heat-dissipating layer and the adhesive layer, wherein the heat-emitting film comprises: a base layer on which an electrode layer and a carbon nanotube heating body are printed; and an insulating layer formed between the electrode layer of the base layer and the first heat-dissipating layer to attach the base layer to the first heat-dissipating layer while insulating the electrode layer and the first heat-dissipating layer from each other.

2. The heat-dissipating film according to claim 1, wherein the carbon nanotube heating body is formed by doping, on surfaces of carbon nanotubes, at least one metal selected from among Ag, Cu, Ni, Au, Pt, and Pd.

3. The heat-dissipating film according to claim 1, wherein the insulating layer is a double-sided adhesive film formed of any one adhesive selected from among acrylic adhesives, hot-melt adhesives, silicone adhesives, and rubber adhesives.

4. The heat-dissipating film according to claim 1, wherein the electrode layer of the base layer is electrically connected to both an anode and a cathode of each of the unit batteries to provide a heat-emitting function to the carbon nanotube heating body.

5. The heat-dissipating film according to claim 1, wherein the base layer is formed of at least one material selected from among biaxially oriented polyester, polyethylene terephthalate, oriented polystyrene, oriented polypropylene, polyethylene naphthalate, polyether sulfone, polyphenylene sulfide, polyimide, and polyether imide.

6. The heat-dissipating film according to claim 1, wherein the adhesive layer is a double-sided tape formed of any one selected from among acrylic tapes, hot-melt tapes, silicone tapes, and rubber tapes.

* * * * *